United States Patent [19]

Sato

[11] Patent Number: 4,943,935

[45] Date of Patent: Jul. 24, 1990

[54] APPARATUS AND METHOD FOR PLOTTING CURVED FIGURES REPRESENTED BY HIGH ORDER FUNCTIONS IN A BIT MAP

[75] Inventor: Fumitaka Sato, Tokyo, Japan

[73] Assignee: Kabushiki Kaisha Toshiba, Kawasaki, Japan

[21] Appl. No.: 248,450

[22] Filed: Sep. 23, 1988

[30] Foreign Application Priority Data

Sep. 25, 1987 [JP] Japan .................................. 62-241434

[51] Int. Cl.$^5$ .............................................. G06F 15/62
[52] U.S. Cl. ..................................... 364/518; 364/523; 340/728; 340/748
[58] Field of Search ............... 340/728, 748, 751, 730, 340/735; 364/577, 520, 523, 518, 521

[56] References Cited

U.S. PATENT DOCUMENTS

| | | | |
|---|---|---|---|
| 4,674,058 | 6/1987 | Lindbloom et al. ................. | 364/518 |
| 4,686,634 | 8/1987 | Schrieber ............................ | 364/523 |
| 4,688,182 | 8/1987 | Schrieber ............................ | 364/523 |
| 4,736,201 | 4/1988 | Nakayama et al. ................... | 340/747 |
| 4,748,443 | 5/1988 | Uehara et al. ........................ | 340/751 |
| 4,855,935 | 8/1989 | Lien et al. ............................ | 364/521 |

OTHER PUBLICATIONS

R. H. Bartels & J. C. Beatty, "An Introduction to Splines for Use in Computer Graphics and Geometric Modeling", Morgan Kaufmann Publishers, Inc., Los Altos, Calif., pp. 211-215.

D. E. Knuth, "The METAFONTbook" Addison Wesley Publishing Co., Reading, Mass., pp. 13-15.

Primary Examiner—Gary V. Harkcom
Assistant Examiner—Raymond J. Bayerl
Attorney, Agent, or Firm—Finnegan, Henderson, Farabow, Garrett, and Dunner

[57] ABSTRACT

A value of a parameter t corresponding to the adjacent next plot point on a bit map memory in an x or y direction is calculated, one of the x or y coordinate values of a current plot point is changed by 1 to calculate a coordinate in the same direction of the next plot point, and the other coordinate of the next plot point is calculated on the basis of an approximated parameter t and cubic curve, thereby plotting the next plot point on the bit map memory.

16 Claims, 5 Drawing Sheets

APPARATUS AND METHOD FOR PLOTTING CURVED FIGURES REPRESENTED BY HIGH ORDER FUNCTIONS IN A BIT MAP

BACKGROUND OF THE INVENTION

1. Field of the Invention

The present invention relates to a plot method and a plot apparatus suitable for expressing a curve such as an edge of a character or a figure using a curve of an nth order, e.g., a Bezier cubic curve.

2. Description of the Related Art

"Post Script" developed by Adobe Systems Co., or the like, is a well-known program language for expressing information including a character font or a figure in various equipment such as a laser beam printer and a display. In order to express a curve such as an edge of a character or a figure using such a program language, the Bezier cubic curve is finally used. The Bezier cubic curve is described in "An Introduction to Splines for use in Computer Graphics and Geometric Modeling" by Richard H. Bartels et al. published by Morgan Kaufmann Publishers. Inc, California. A character font is described in "The Metafont Book" by Donald E. Knuth published by Addison Wesley Publishing Company.

Bezier cubic curve B(t) is represented by following equation (1) using parameter t:

$$B(t) = x_0(t)Q_0 + x_1(t)Q_1 + x_2(t)Q_2 + x_3(t)Q_3 \quad (1)$$

where
$x_0(t) = (1-t)^3$
$x_1(t) = 3(1-t)^2 t$
$x_2(t) = 3(1-t)t^2$
$x_3(t) = t^3$
$0 \leq t \leq 1$ and $Q_0$ to $Q_3$ are points of the position vectors designated to determine a shape. $Q_0$ and $Q_3$ are start and end points of curve segment B(t) within the range of $0 \leq t \leq 1$, respectively. $Q_0$ to $Q_3$ are also called control points.

Figure 1:
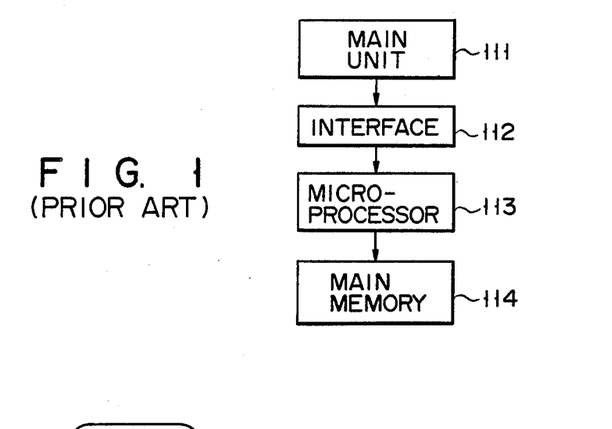
FIG. 1 is a block diagram showing an arrangement of a conventional plot apparatus.

In general, a conventional Post Script printer control section of, e.g., a desk top publishing system for printing a character font or a figure represented by a Post Script language comprises microprocessor 113 as a main unit of the control section and main memory 114, which stores programs and data of microprocessor 113, as shown in FIG. 1. An image of a page to be printed is stored in a portion of a memory area of memory 114. It is a matter of course that, in some systems, this portion is formed independently of memory 114 as a bit map memory.

In FIG. 1, microprocessor 113 is connected to desk top publishing system main unit 111 through interface 112. Microprocessor 113 interprets a Post Script language supplied from system main unit 111 through interface 112, performs the plotting calculations required for forming an edge line of a character or the like, plots the edge line, and then performs fill processing for filling an interior. Thereafter, page printing is performed by controlling a printer (not shown), e.g., a laser beam printer.

Figure 2:
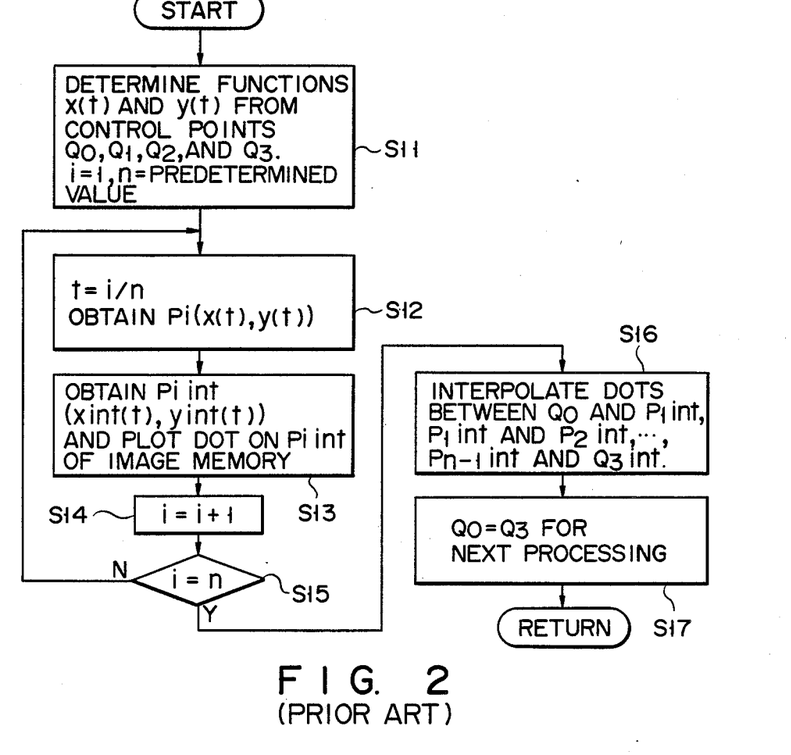
FIG. 2 is a flow chart for explaining an operation of the conventional plot apparatus.

Conventional Bezier cubic curve plot processing performed by microprocessor 113 will be described with reference to a flow chart shown in FIG. 2.

Control points $Q_0$ to $Q_3$ are designated on a figure to be described below. X component x(t) and y component y(t) of an edge of the figure are determined from control points $Q_0$ to $Q_3$ using equation (1) above. Functions x(t) and y(t) are represented by following equations (2) and (3):

$$x(t) = a_x t^3 + b_x t^2 + c_x t + d_x \quad (2)$$

$$y(t) = a_y t^3 + b_y t^2 + c_y t + d_y \quad (3)$$

where $a_x$, $b_x$, $c_x$, $d_x$, $a_y$, $b_y$, $c_y$, and $d_y$ are the coefficients determined in accordance with the x and y components of position vectors (control points) $Q_0$ to $Q_3$.

First, in step S11, microprocessor 113 calculates the coefficients in equations (2) and (3) from control points $Q_0$, $Q_1$, $Q_2$, and $Q_3$, of a Bezier cubic curve segment to be plotted. A domain of parameter t is equally divided into n portions (n is a predetermined number), thereby obtaining t values $t_1, t_2, \ldots, t_{n-1}$. In steps S12 to S15, x and y coordinates of each of points $P_1, P_2, \ldots, P_{n-1}$ on the curve corresponding to the respective obtained t values are calculated using equations (2) and (3). The x and y coordinates are rounded to approximate integers $P_{i\ int}$. Data are plotted on an image memory region in memory 114 in accordance with the obtained integers. Thereafter, in step S16, adjacent points between points $Q_0, P_{1\ int}, P_{2\ int}, \ldots, P_{n\ lint}, Q_3$ are sequentially interpolated with straight lines, and interpolated data are plotted. In this case, value n is often 16 or 64.

However, the above conventional plot apparatus has the following problems.

That is, the Post Script language includes several hundred commands. Therefore, when microprocessor 113 serially processes interpretation of the complex Post Script language for a large amount of data to be processed, the processing speed of the system is reduced.

In addition, when an edge of a smaller character which is generally widely used is to be plotted, each of the curve segments constituting the edge of the character has a smaller value than that of a dot interval, i.e., an image lattice interval of a printer in a laser beam printer or the like. For this reason, even if t values are different, the segments are often plotted at a single lattice point. Therefore, calculation of a plot point for each t value is inefficient, resulting in a low processing speed.

Furthermore, when an edge of a larger character is to be plotted, the above problem is not significant as compared with the case wherein a smaller character is plotted. However, a plot interval is increased to a multiple of a lattice point interval. Therefore, when the edge is printed, it becomes obvious that a curve is approximated by straight lines. That is, a smooth curve cannot be obtained. This tendency is significant when the value of n is small and a curvature is large.

SUMMARY OF THE INVENTION

The present invention has been made in consideration of the above situation and has as its object to provide a plot method and a plot apparatus which can prevent, when a figure or the like is to be plotted using a curve of an nth order, e.g., a Bezier cubic curve segment, useless repetitive calculation of a single plot point and can prevent a plot interval from being increased larger than a lattice point interval, thereby achieving high-speed processing and drawing a smooth curve.

The apparatus can plot figure F (x(t), y(t)) represented by functions x(t) and y(t) of nth order at high speed. In this case, functions x(t) and y(t) are given by the following equations:

$$x(t) = \sum_{i=0}^{n} a_{xi}t^i, \quad y(t) = \sum_{i=0}^{n} a_{yi}t^i$$

where values from $a_{x0}$ to $a_{xn}$ and $a_{y0}$ to $a_{yn}$ are predetermined.

The apparatus comprises: a bit map memory for storing image bit data; and a plotter responsive to an input figure processing command for selecting one of functions x(t) and y(t) in accordance with slopes of tangents of functions x(t) and y(t) at current value $t_m$ of parameter t, calculating next integer $u_{m+1}$ of current integer $u_m$ of the selected function, calculating value $t_{m+1}$ of parameter t corresponding to integer $u_{m+1}$, calculating integer $v_{m+1}$ approximate to a value of the other function at value $t_{m+1}$, and plotting the image bit data in the bit map memory in accordance with integers $u_{m+1}$ and $v_{m+1}$.

Functions x(t) and y(t) can be Bezier cubic curves which satisfy the following relations, respectively:

$$x(t) = P_0(t)Q_{0x} + P_1(t)Q_{1x} + P_2(t)Q_{2x} + P_3(t)Q_{3x}$$

$$y(t) = P_0(t)Q_{0y} + P_1(t)Q_{1y} + P_2(t)Q_{2y} + P_3(t)Q_{3y}$$

where
$P_0(t) = (1-t)^3$
$P_1(t) = 3(1-t)^2 t$
$P_2(t) = 3(1-t)t^2$
$P_3(t) = t^3$
$0 \leq t \leq 1$, and
$Q_0$ ($Q_{0x}, Q_{0y}$) to $Q_3$ ($Q_{3x}, Q_{3y}$) are coordinate positions designated in advance to determine a shape.

In order to achieve the above object, a plot method comprises the steps of: calculating next integer $u_{m+1}$ of current integer $u_m$ of a selected one of the above functions x(t) and y(t) at current value $t_m$ of parameter t in response to a figure processing command; calculating value $t_{m+1}$ of parameter t corresponding to integer $u_{m+1}$; calculating integer $v_{m+1}$ approximate to a value of the other function at value $t_{m+1}$; and plotting the image bit data in a bit map memory in accordance with calculated integers $u_{m+1}$ and $v_{m+1}$.

As described above, according to the present invention, each plot point represented using a curve of an nth order, e.g., the Bezier cubic curve is always offset from an immediately preceding plot point by at least one lattice point in the x or y direction and therefore does not overlap it. Therefore, a single point is not plotted again, i.e., useless repetitive calculation of a single point can be prevented, resulting in high-speed processing. In addition, according to the present invention, since a plot point array continues in units of lattice points in the x or y direction, processing of connecting adjacent plot points by a straight line (linear approximation processing) need not be performed. Therefore, even if a character including a curve having a large curvature is printed in an enlarged scale, there is no possibility that an unnatural curve having a noticeable straight portion will be formed. Furthermore, since the processing can be performed by two processors, high-speed processing can be performed.

DETAILED DESCRIPTION OF THE PREFERRED EMBODIMENTS

A plot apparatus according to the present invention will be described in detail below with reference to the accompanying drawings.

An arrangement of a first embodiment of the plot apparatus according to the present invention will be described below with reference to FIG. 4.

Figure 4:
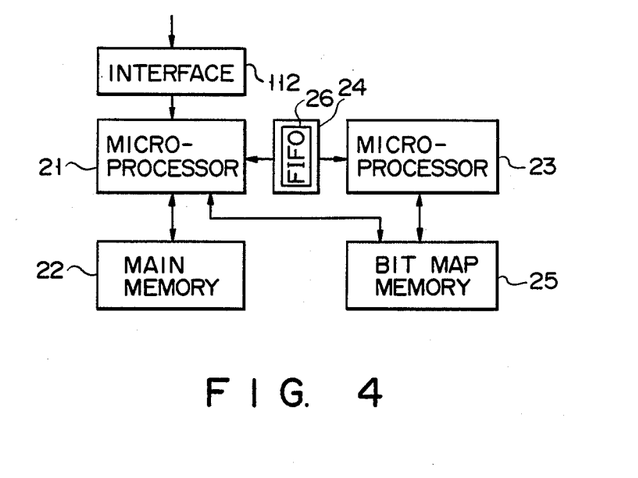
FIG. 4 is a block diagram showing an arrangement of a first embodiment of a plot apparatus according to the present invention.

In FIG. 4, interface 112 receives a Post Script command from a main unit (not shown) and supplies it to versatile microprocessor 21. Microprocessor 21 interprets most of the Post Script commands. Main memory 22 is used by microprocessor 21 and similar to main memory 114 shown in FIG. 1. Microprocessor 21 is connected through interface 24 to high-speed operation microprocessor (e.g., the XL8000 series available from WEITEK Co.) 23 for receiving only commands (e.g., CURVE and LINE) directly concerning generation of image bit data (bit map memory data) of the Post Script commands from microprocessor 21. Interface 24 may transmit/receive commands and image bit data through main memory 22. Bit map memory 25 for storing image bit data is connected to microprocessors 21 and 23. Note that commands to be executed by microprocessor 23 (i.e., those directly concerning bit image generation) are often continuously supplied. Therefore, in order to increase a ratio of time in which both microprocessors 21 and 23 operate, interface 24 includes FIFO (First In First Out) buffer memory 26. This buffer memory can be prepared as software in a portion of main memory 22 not subjected to display and printing image data stored in bit map memory 25.

Figure 3A:
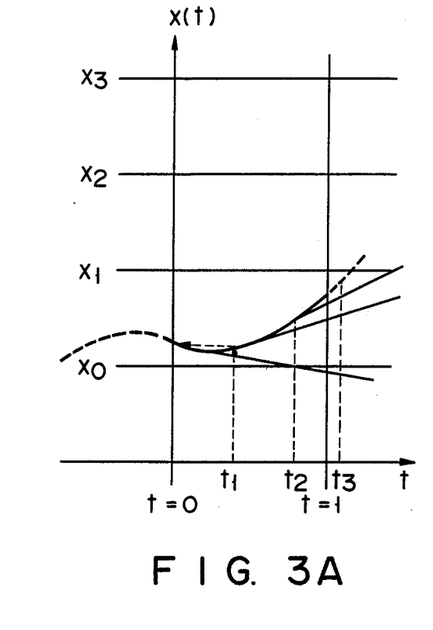
FIGS. 3A and 3B are graphs for explaining a principle of the present invention.
Figure 3B:
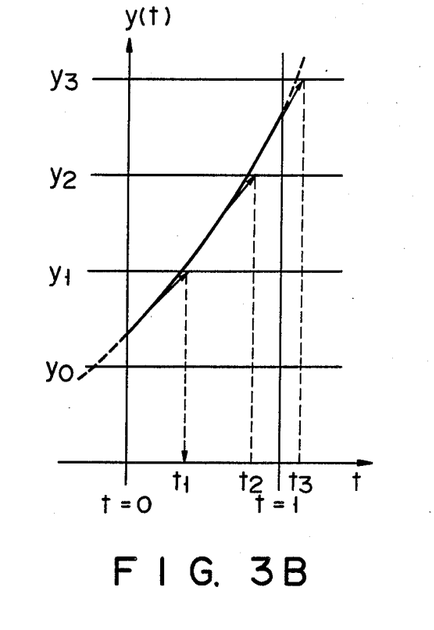

Plot processing performed by microprocessor 23 shown in FIG. 4 will be schematically described below with reference to FIGS. 3A and 3B. FIG. 3A shows a curve represented by equation (2), i.e., Bezier cubic function x(t) of an x component of figure P (x(t),y(t)), and FIG. 3B shows a curve represented by equation (3), i.e., Bezier cubic function y(t) of a y component.

First, microprocessor 23 calculates differential values of functions x(t) and y(t), i.e., slopes $\dot{x}(0)$ and $\dot{y}(0)$ of tangents obtained when t=0 which corresponds to $Q_0$, and compares their absolute values. In FIGS. 3A and 3B, the following inequality is obtained:

$$|\dot{y}(t)| > |\dot{x}(t)|, \text{ where } t=0$$

This inequality indicates that a change in function y(t) is larger than in function x(t) as parameter t is increased. In this case, microprocessor 23 calculates approximation value $t_1$ of parameter t at which function y(t) takes next integer $y_1$ in accordance with y(0) obtained when t=0, i.e., the slope of the tangent of function y(t) obtained when t=0 as shown in FIG. 3B. Then, microprocessor 23 calculates function value x(t₁) using t₁, and calculates integer x₀ approximate to value x(t₁). Thereafter, microprocessor 23 writes image bit data corresponding to point P₁ in coordinates (x₀,y₁) on memory 25.

After the above processing is completed, t=t₁ is set, and similar processing is repeatedly performed in the same manner as when t=0. In this case, function value y(t₁) need not be calculated in order to obtain value y₁. That is, value y₁ can be obtained by only adding or subtracting 1 to or from y₀ at the immediately preceding plot point. Whether 1 is added or subtracted at value $t_n$ is determined in accordance with differential value $\dot{y}(t_n)$ at value $t_n$. When a value of t which is sequentially calculated as described above satisfies t≧1, control point Q₃ as an end point is passed, and therefore plot processing of this curve segment is completed. Note that whether a point corresponding to last t (t₃ in FIGS. 3A and 3B) obtained when t≧1 is to be plotted on memory 25 is determined in accordance with whether value t3 or t2 is closer to 1.

Figure 5A:
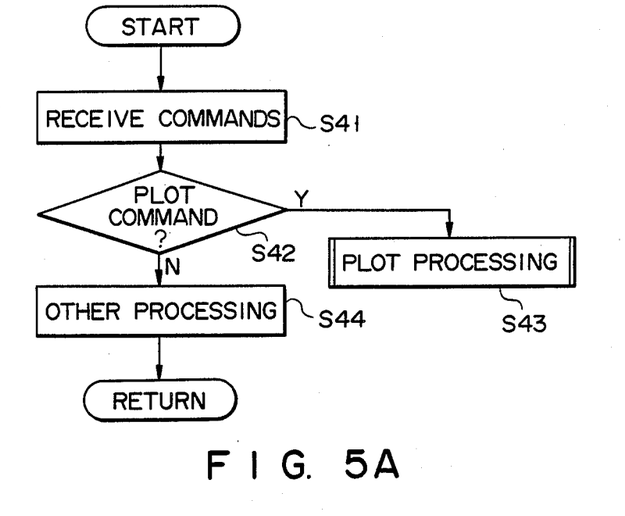
FIGS. 5A and 5B are flow charts for explaining an operation of the plot apparatus of the first embodiment.

The above plot processing of microprocessor 23 will be described in more detail below with reference to flow charts in FIGS. 5A and 5B.

In step S41, microprocessor 21 receives a Post Script command from interface 112 and interprets the command. In step S42, microprocessor 21 determines whether the command is to be executed by microprocessor 21 or 23. If microprocessor 21 determines that the command is to be executed by microprocessor 23, it sends the command to microprocessor 23 through interface 24. When microprocessor 23 receives the command sent through interface 24, it executes the command and writes image bit data into memory 25 in step S43 of FIG. 5A. Microprocessor 21 checks, interprets, and executes the next command while microprocessor 23 performs the above bit image generation operation. In this manner, microprocessors 21 and 23 can operate simultaneously. In addition, microprocessor 21 can be a versatile microprocessor capable of processing various tasks and a high-speed operation microprocessor capable of processing a large amount of data at high speed can be used as microprocessor 23. Therefore, processing can be executed at higher speed than in the conventional arrangement shown in FIG. 1.

Figure 5B:
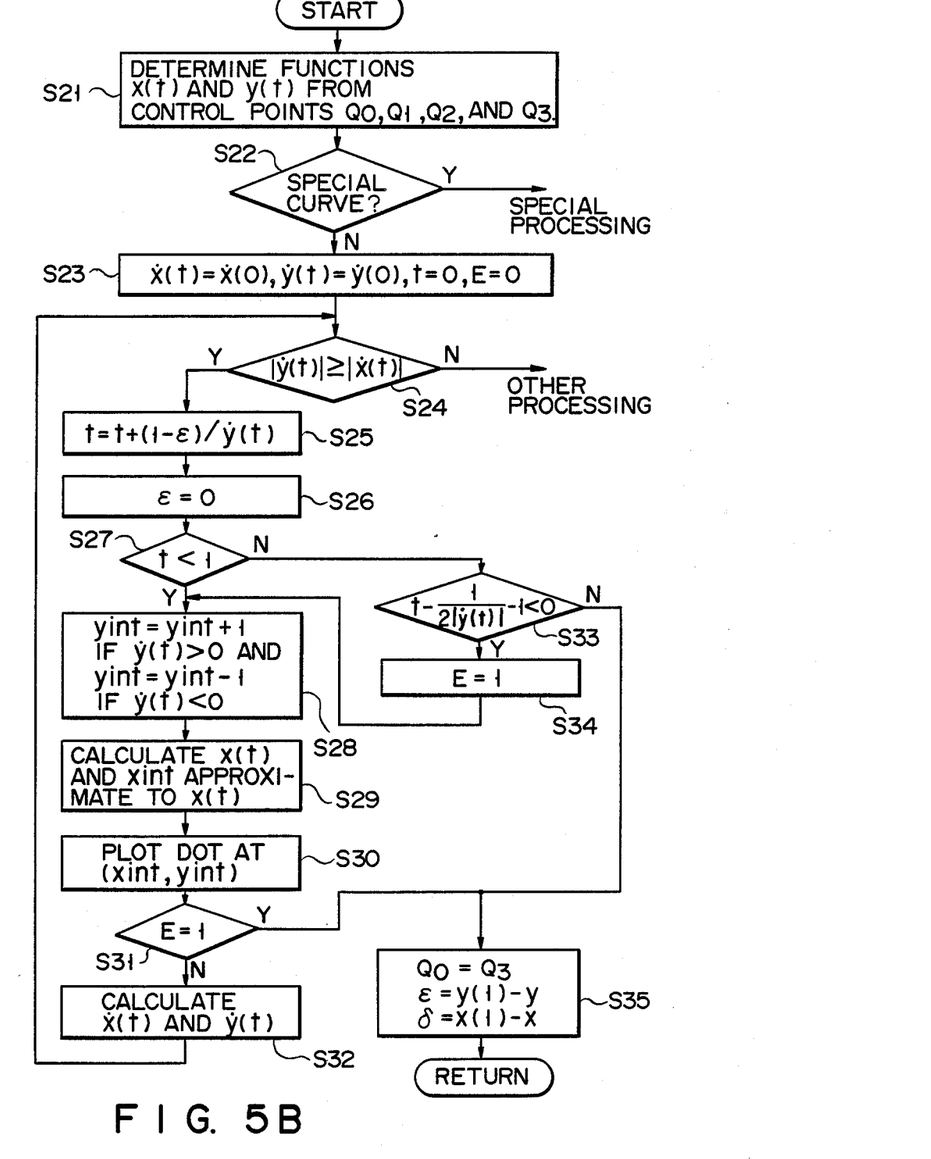

When microprocessor 23 receives the command from microprocessor 21 in step S21 of FIG. 5B, it calculates coefficients in equations (2) and (3) from predetermined control points Q₀, Q₁, Q₂, and Q₃ of a figure P (x(t),y(t)) to be plotted. If microprocessor 23 determines that special processing is to be performed during calculation in step S21, the special processing is executed in step S22. The special processing is executed when, e.g., a curve segment is very short in memory 25. In this case, data is plotted directly from polygon Q₀Q₁Q₂Q₃ formed by the control points without calculating a cubic equation. If a curve segment has a peak, the special processing is required because a differential value cannot be calculated. However, the Bezier cubic curve for expressing a character font normally has no peak.

If microprocessor 23 determines that the special processing need not be executed, the flow advances to step S23. Step S23 is part of the initializing processing in which only processing required to understand the following processing flow is represented as an independent step. That is, an order of steps S21 to S23 is not essential. In step S23, 0 (lower limit of t) is set, and differential values of functions x(t) and y(t) represented by equations (2) and (3) obtained when t=0, i.e., slopes x(0) and y(0) of the tangents are calculated. In addition, end flag E to be described later is initialized to be 0 in step S23.

When microprocessor 23 completes the above initializing processing, it calculates differential values $\dot{x}(t)$ and $\dot{y}(t)$ at a current of value of t of parameter t of functions $\dot{x}(t)$ and $\dot{y}(t)$ in step S24. Microprocessor 23 checks which of the absolute values of differential values y(t) and $\dot{x}(t)$ is larger. If the absolute value of differential value $\dot{y}(t)$ is larger, processing from step S25 to be described below is executed. If the absolute value of differential value x(t) is larger, other processing is executed. The other processing is similar to the following description, except that the functions $\dot{y}(t)$ and $\dot{x}(t)$ are switched, and therefore its description will be omitted. Note that if the absolute values equal each other, either processing may be performed.

Figure 6:
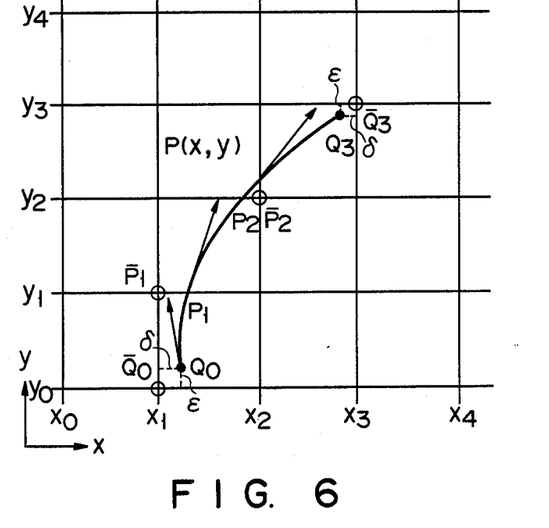
FIG. 6 is a graph for schematically explaining an operation of plot processing of the plot apparatus according to the present invention.

If $|\dot{y}(t)| \geq |\dot{x}(t)|$, the flow advances to step S25, and microprocessor 23 calculates $$t+(1-\epsilon)/|\dot{y}(t)|$$

using current t value and the absolute value of $\dot{y}(t)$ to obtain a new t value t₁ at which function y(t) takes the next integer, i.e., a t value t₁ corresponding to the next plot point. Note that an initial value of ε is a difference between a y coordinate value of point Q₀ as shown in FIG. 6 and that of plot point $\overline{Q}_0 (=Q_{0\ int})$ corresponding to point Q₀. When microprocessor 23 completes step S25, it sets ε to be 0 in order to perform processing in step S25 in a loop thereafter to be executed thereafter (step S26).

When microprocessor 23 completes step S26, it checks whether the value of parameter t calculated in step S25 exceeds an upper limit of a domain (i.e., t≧1) or not (i.e., t<1), thereby determining an end of the plot processing of the curve segment (step S27). If t<1, the processing must be continued. Therefore, the flow advances to step S28, and microprocessor 23 performs +1 or −1 processing of y coordinate value y₀ $_{int}$ at current plot point, thereby calculating y coordinate value y₁ $_{int}$ at next plot point (step S28). In this case, whether +1 or −1 processing is to be performed is determined in accordance with the polarity of differential value $\dot{y}(t_0)$ used in determination in step S24, i.e., polarity of the slope of the tangent or differential value $\dot{y}(t_0)$ at value to of parameter t corresponding to a current plot point. If the value is positive, +1 processing is adopted, and if the value is negative, −1 processing is adopted. Thereafter, microprocessor 23 calculates function x(t₁) using value t₁ of parameter t calculated in step S25 and equation (2) and then calculates integer x₁ $_{int}$ approximate to an x coordinate value of the next plot point (step S29). Then, microprocessor 23 plots image bit data at coordinates P$_{iint}$ (x₁ $_{int}$, y₁ $_{int}$) (=$\overline{P}_1$) on memory 25 calculated in steps S29 and S28 (step S30), and checks in step S31 whether end flag E is 0 or 1. If E=0, in order to continue the plot processing of the curve segment, microprocessor 23 calculates differential values $\dot{x}(t_1)$ and $\dot{y}(t_1)$ at the value t₁ of parameter t calculated in step S25, and the flow returns to step S24.

If t≧1 is determined in step S27, the flow advances to step S33, and microprocessor 23 checks whether the last point is to be plotted in accordance with whether value $t_L$ of parameter t corresponding to the last point and value $t_{L-1}$ of parameter t corresponding to the immediately preceding plot point is approximate to 1. More specifically, this determination is performed as follows. That is, $t_L$ is closer to 1 than $t_{L-1}$ if following inequality (4) is satisfied:

$$t_L - 1 < 1 - t_{L-1} \quad (4)$$

$t_{L-1}$ and $t_L$ satisfy following equation (5) as is apparent from the processing (for $\epsilon = 0$) in step S25:

$$t_{L-1} = t_{L-1}/|\dot{y}(t_L)| \quad (5)$$

Therefore, when inequality (4) is substituted in equation (5), inequality (4) is given by:

$$t_L - 1 < 1 - \{t_{L-1}/|\dot{y}(t_L)|\}$$

That is, inequality (4) is rewritten as following inequality (6):

$$t_L - 1/\{2\dot{y}(t_L)\} - 1 < 0 \quad (6)$$

Therefore, in step S33, a value of the left side of inequality (6) is calculated, and whether $t_L$ is approximate to 1 is checked in accordance with whether the calculated value is negative or positive, thereby determining whether the last point is to be plotted.

If the value of the left side of inequality (6) is negative, i.e., $t_L$ is closer to 1 than $t_{L-1}$, microprocessor 23 sets 1 in end flag E (step S34) and then executes steps S28 to S30. Thereafter, microprocessor 23 checks the state of end flag E in step S31, and the flow advances to end processing in step S35 (because E=1). If the value of the left side of inequality (6) is positive, i.e., $t_{L-1}$ is closer to 1 than $t_L$, the last point need not be plotted, and therefore the flow advances directly from step S33 to S35. In step S35, in order to plot the next curve segment, control point $Q_3$ as an end point of the currently plotted curve segment is used as control point $Q_0$ as a start point, and differences $\delta$ and $\epsilon$ of x and y coordinates between point $Q_0$ and a start plot point of a curve segment to be plotted next, i,e., the last plot point of the currently plotted curve segment are calculated.

In the above description and the flow chart in FIG. 5B, processing to be performed when $|y(t)| < |x(t)|$ is omitted. If necessary, x need only be replaced with y in steps S25, S28, S29, and S34.

In the above processing, cubic functions x(t) and y(t) and quadratic functions x(t) and y(t) are directly calculated. However, if the functions are calculated by a differential operation using digital differentiation, the number of multiplication and division operations can be reduced.

Figure 7:
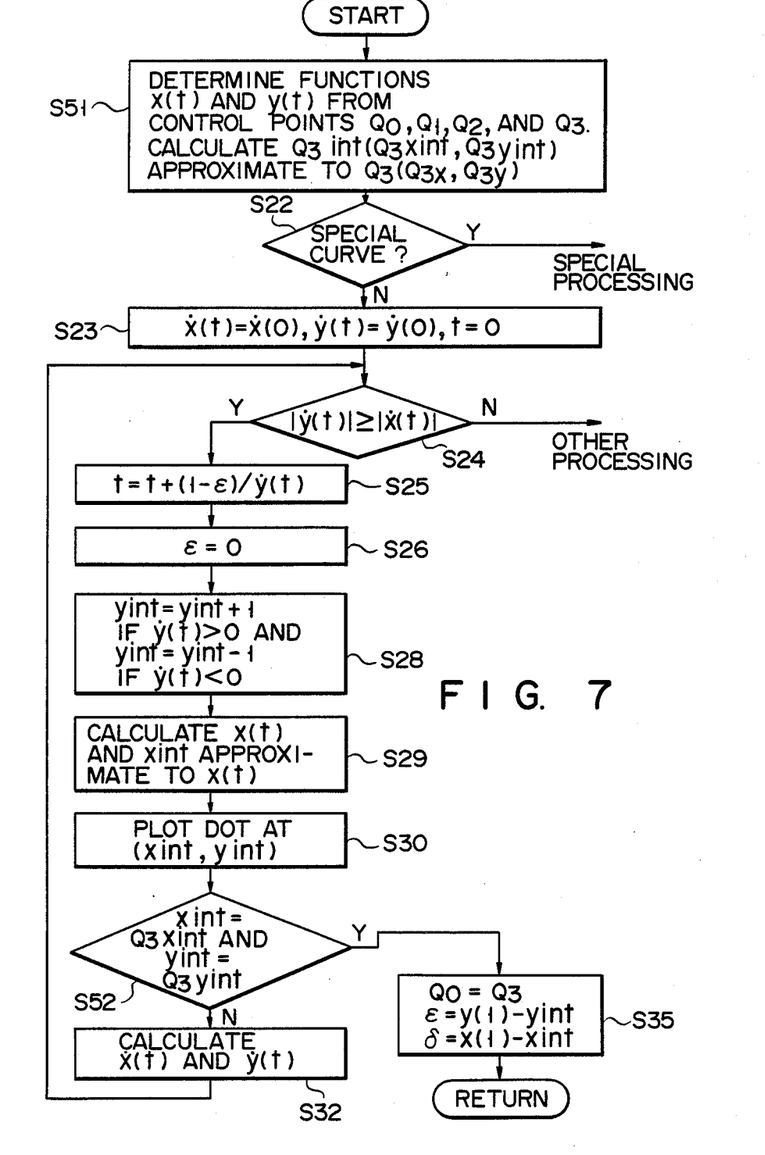
FIG. 7 is a flow chart for explaining an operation of a plot apparatus according to a second embodiment of the present invention.

An operation of a second embodiment will be described below with reference to FIG. 7. An arrangement of the second embodiment is similar to that shown in FIG. 4, and its operation is substantially the same as that shown in FIG. 5B. Therefore, only a difference will be described below.

In step S51 similar to step S21, plot point $Q_{3int}$ ($Q_{3xint}, Q_{3yint}$) (=$\overline{Q}_3$) approximate to end point $Q_3$ is calculated. Then, processing similar to the plot processing shown in FIG. 5B is performed. In step S52 similar to step S31 in FIG. 5B, it is checked whether calculated plot point $P_i$ ($x_{iint}, y_{iint}$) is equal to plot point $Q_{3int}$ ($Q_{3xint}, Q_{3yint}$) as an end point. If the points equal each other, step S35 is executed, and preparation for processing of the next curve segment is performed. In this manner, processing concerning the end point can be executed at higher speed than that of the processing shown in FIG. 5B.

what is claimed is:

1. An apparatus for plotting a curved figure defined by loci of first and second functions having a common variable, the first and second functions being nth order functions (where n is an integer greater than two), comprising:
   bit map memory means for storing dots representing the curved figure, a previous dot of the dots being stored at a coordinate point designated by first and second previous coordinate values;
   coordinate value determining means for determining a current value of the variable in accordance with a previous value of the variable, a predetermined integer and a slope of the first function at the previous value of the variable, determining a first current coordinate value by adding the predetermined integer to the first previous coordinate value, and determining a second current coordinate value in accordance with a current function value of the second function at the current value of the variable; and
   plot means for plotting a current dot in said bit map memory means at a coordinate point designated by the first and second current coordinate values.

2. An apparatus according to claim 1, wherein the variable values vary between "0" to "1" and the first and second functions are Bezier cubic curves.

3. An apparatus according to claim 1, wherein said coordinate value determining means includes means for selecting the first function from the first and second functions in accordance with slopes of the first and second functions at the previous value of the variable to determine the current value of the variable.

4. An apparatus according to claim 1, wherein said coordinate value determining means includes means for determining as the predetermined integer one of "138 and "−1" in accordance with the slope of the first function at the previous value of the variable.

5. An apparatus according to claim 1, wherein said coordinate value determining means includes:
   means for obtaining the current function value of the second function at the current value of the variable; and
   means for obtaining the second current coordinate value at a coordinate lattice approximate to the current function value.

6. An apparatus according to claim 1, wherein the variable values vary between "0" and "1" and said coordinate value determining means includes means for determining the first and second current coordinate values when the previous value of the variable as less then "1" the current value is greater than "1" and the current value is less than "2" minus the previous value.

7. An apparatus according to claim 1, further comprising means for designating the current value of the variable and the first and second current coordinate values as the previous value and the first and second previous coordinate values, respectively and for starting said coordinate value determining means for a next dot.

8. A method for plotting a curved figure defined as loci of functions x(t) and y(t) using a parameter t, the functions x(t) and y(t) being nth order functions (where n is an integer greater than two, comprising the steps of:
   determining tangent lines of the functions x(t) and y(t) at a previous value of the parameter t;
   selecting one of the functions x(t) and y(t) as a first function in accordance with absolute values of slopes of the determined tangent lines, the other functions being a second function;

adding a first previous coordinate value to a predetermined integer to determine a first current coordinate value, a previous dot being plotted in a bit map memory at a coordinate point designated by the first previous coordinate value and a second previous coordinate value;

determining a current value of the parameter t in accordance with the tangent line of the first function, the predetermined integer and the previous value of the parameter;

determining a second current coordinate value in accordance with a value of the first function at the current value of the parameter t; and plotting a current dot in the bit map memory at a coordinate point designated in accordance with the first and second current coordinate values.

9. A method according to claim 8, wherein $0 \leq t \leq 1$ and the functions x(t) and y(t) and Bezier cubic curves.

10. A method according to claim 8, wherein the predetermined integer is selected from "1" and "−1" in accordance with an absolute value of the slope of the first function at the previous value of the variable.

11. A method according to claim 8, wherein the parameter t values vary between "0" and "1" and said plotting step includes plotting the current dot in the bit map memory when the previous value is less than "1," the current value is greater than "1," and the current value is less than "2" subtracted by the previous value.

12. A method according to claim 8, further comprising the step of designating the current value and the first and second current coordinate values as the previous value and the first and second previous coordinate values to perform said determining step of the tangent lines.

13. An apparatus for plotting a curved figure represented by loci of nth order functions x(t) and y(t) (where n is an integer greater than two) at high speed, comprising:

bit map memory means for storing dots representing the curved figure;

coordinate value determining means for calculating slopes of tangent lines of the functions x(t) and y(t) at a current value $t_m$ of a parameter t to obtain absolute values of the slopes of the tangent lines, selecting as a first function one of the functions x(t) and y(t) in accordance with the absolute values, the other function being a second function, selecting one of values $u_m+k$ and $u_m-k$ (where k is a predetermined position integer), as a first coordinate value $u_{m+1}$ of the first function for a dot to be plotted next, in accordance with the slope of the tangent line of the first function and a current first function value $u_m$ of the first function, calculating a next value $t_{m+1}$ of the parameter t from the integer r, the current value $t_m$ and the absolute value of the first function to obtain a second coordinate value $v_{m+1}$ approximate to a value of the second function at the next value $t_{m+1}$ of the parameter t; and plot means for plotting the next dot in said bit map memory means in accordance with the first and second coordinate values $u_{m+1}$ and $v_{m+1}$.

14. An apparatus according to claim 13, wherein said plot means further comprises means for determining the functions x(t) and y(t) from the designated coordinate points Q0(Q0x,Q0y) to Q3(Q3x,Q3y) in accordance with the figure processing command.

15. An apparatus according to claim 14, wherein said plot means includes means for calculating an integer coordinate point Q0int (Q0xint,Q0yint) approximate to the coordinate point Q0(Q0x,QQ0y) as a start point, and selecting one of values Q0xint and Q0yint as the first function value $u_m$ in accordance with the selected function.

16. An apparatus according to claim 14, wherein said plot means includes means for plotting, when $t_m < 1$, $t_{m+1} > 1$, and $t_{m+1} < 2-t_m$, image bit data in said bit map memory means in accordance with the obtained integers $u_{m+1}$ and $v_{m+1}$.

* * * * *

UNITED STATES PATENT AND TRADEMARK OFFICE
CERTIFICATE OF CORRECTION

PATENT NO. : 4,943,935
DATED : July 24, 1990
INVENTOR(S) : Fumitaka Sato

It is certified that error appears in the above-identified patent and that said Letters Patent is hereby corrected as shown below:

Claim 4, column 8, line 36, change "138" to --"1"--.

Claim 13, column 10, line 17, change "r" to --k--.

Signed and Sealed this

First Day of June, 1993

Attest:

MICHAEL K. KIRK

Attesting Officer

Acting Commissioner of Patents and Trademarks